United States Patent [19]

Waddill

[11] Patent Number: 4,528,308

[45] Date of Patent: Jul. 9, 1985

[54] EPOXY RESIN CURATIVES

[75] Inventor: Harold G. Waddill, Austin, Tex.

[73] Assignee: Texaco Inc., White Plains, N.Y.

[21] Appl. No.: 516,505

[22] Filed: Jul. 25, 1983

[51] Int. Cl.³ .............................................. C08G 59/50
[52] U.S. Cl. ................................... 523/466; 523/400;
523/445; 523/468; 525/113; 525/423; 528/94;
528/111; 528/407
[58] Field of Search ................ 528/94, 111, 407;
523/445, 468, 466, 400; 525/113, 423

[56] References Cited

U.S. PATENT DOCUMENTS

| | | | |
|---|---|---|---|
| 3,306,809 | 2/1967 | Williamson et al. | 528/111 X |
| 3,645,969 | 2/1972 | Harvey | 528/111 |
| 4,417,010 | 11/1983 | Shimp | 528/111 X |
| 4,420,605 | 12/1983 | Kaufman | 528/111 X |

*Primary Examiner*—Earl A. Nielsen
*Attorney, Agent, or Firm*—Jack H. Park; Kenneth R. Priem; Richard A. Morgan

[57] ABSTRACT

A novel diepoxide curing agent is revealed. The curing agent comprises a mixture of an imidazole compound and a selected polyoxyalkylenepolyamine.

This curative produces an epoxy resin of low viscosity with a prolonged pot life. They find particular usefulness in filament winding and pultrusion processes where they are used to fabricate articles of considerable strength.

14 Claims, No Drawings

EPOXY RESIN CURATIVES

The structure for the condensation product of epichlorohydrin and bisphenol A in a preferred embodiment of the present invention is:

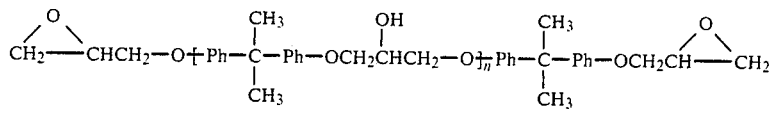

BACKGROUND OF THE INVENTION

1. Field of the Invention

This invention relates to curable epoxy resins. More particularly it relates to curing agents for diepoxides which comprise a mixture of an imidazole compound and a polyoxyalkylenepolyamine in a specified ratio.

2. Description of the Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. Conventional curing agents include such compounds as polyamines, polycarboxylic acids, anhydrides and Lewis acids.

Handbook of Epoxy Resins, H. Lee and K. Neville, McGraw Hill Book Co., New York, 1967, Chapter 10, page 17 mentions the use of imidazole compounds as epoxy resin curatives.

SUMMARY OF THE INVENTION

The invention relates to an epoxy resin composition comprising a liquid diepoxide of molecular weight 350 to 400 and an effective amount of a curing agent. The curing agent comprises a 1:2 to 1:10 mixture of an imidazole compound selected from the group consisting of imidazole and substituted imidazole and a selected polyoxyalkylenepolyamine of specified molecular weight. The polyoxyalkylenepolyamine of molecular weight 200 to 2000 is selected from the group consisting of the polyoxyalkylenepolyamine of the formula:

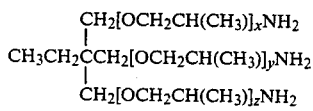

wherein $x+y+z$ averages 5.3 and the polyoxyalkylenepolyamine of the formula:

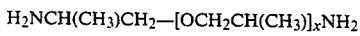

wherein x averages 2.6 to 33.1.

These epoxy compositions provide resins that combine low viscosity with extended pot life.

DESCRIPTION OF THE PREFERRED EMBODIMENTS

Part A of the two-part composition of the present invention comprises an epoxy base resin which is a liquid diepoxide. The preferred epoxy base resin is a condensation product of epichlorohydrin with a modified aromatic or aliphatic diol, for example, ethylene glycol, diethylene glycol, glycerol, diglycerol, catechol, resorcinol, a di(hydroxyphenyl)methane, a di(hydroxyphenyl)ethane, a di(hydroxyphenyl)propane, etc. A preferred diol is bisphenol A.

wherein Ph is phenylene and n is an integer such that the molecular weight of the diepoxide averages 350 to 400.

A widely used class of diepoxides which are useful according to the present invention includes the resinous epoxy polyethers obtained by reacting an epihalohydrin, such as epichlorohydrin, and the like, with either a dihydric phenol or a dihydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol,
2,4'-dihydroxydiphenylethylmethane,
3-3'-dihydroxydiphenyldiethylmethane,
3,4'-dihydroxydiphenylmethylpropylmethane,
2,3'-dihydroxydiphenylethylphenylmethane,
4,4'-dihydroxydiphenylpropylphenylmethane,
4,4-dihydroxydiphenylbutylphenylmethane,
2,2'-dihydroxydiphenylditolylmethane,
4,4'-dihydroxydiphenyltolylmethylmethane and the like.

Other polyhydric phenols which may also be coreacted with an epihalohydrin to provide these epoxy polyethers are such compounds as resorcinol, hydroquinone, substituted hydroquinones, e.g., methylhydroquinone, and the like.

It will be appreciated by those skilled in the art that the diepoxide compositions which are useful according to the practice of the present invention are not limited to those containing the above described diepoxides, but that these diepoxides are to be considered merely as being representative of the class of diepoxides as a whole.

Part B of the two part composition of the present invention comprises an effective amount of a novel curative agent. The curative agent is a 1:2 to 1:10, preferably 1:4 to 1:6, mixture of an imidazole compound selected from the group consisting of imidazole and substituted imidazole and a polyoxyalkylenepolyamine of specified molecular weight.

The substituted imidazole may preferably be selected from the group consisting of 1-methyl imidazole, 2-methyl imidazole, 2-alkyl imidazole wherein the alkyl group is from 10 to 18 carbon atoms, 2-ethyl-4-methyl imidazole, 2-phenyl imidazole and 1-phenyl-2-methyl imidazole. As seen in the Examples, 1-methyl imidazole produces superior results.

The polyoxyalkylenepolyamine is of molecular weight 200 to 2000. A preferred class of polyoxyalkylenepolyamines is the polyoxyalkylenetriamine of average molecular weight 400 of the formula:

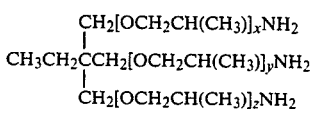

wherein x+y+z averages 5.3.

Another preferred class of polyoxyalkylenepolyamine is the class of polyoxyalkylenediamines of average molecular weight 200 to 2000, of the formula:

$$H_2NCH(CH_3)CH_2—[OCH_2CH(CH_3)]_xNH_2$$

wherein x averages 2.6 to 33.1.

A preferred polyoxyalkylenediamine is of the formula:

$$H_2NCH(CH_3)CH_2—[OCH_2CH(CH_3)]_xNH_2$$

wherein x averages 2.6 and the molecular weight averages 230.

Another preferred polyoxyalkylenediamine is of the formula:

$$H_2NCH(CH_3)CH_2—[OCH_2CH(CH_3)]_xNH_2$$

wherein x averages 5.6 and the molecular weight averages 400.

Another preferred polyoxyalkylenediamine is of the formula:

$$H_2NCH(CH_3)CH_2—[OCH_2CH(CH_3)]_xNH_2$$

wherein x averages 33.1 and the molecular weight averages 2000.

In the composition, article of manufacture and process of the present invention, the imidazole compound and polyoxyalkylenepolyamine are mixed to form a compatible solution. The epoxy base resin is added and the components thoroughly contacted by mixing until a homogeneous mixture is obtained.

The curative agent is usually added to the formulation in such an amount that there is one reactive hydrogen atom in the curing component for each epoxy group in the epoxy resin component. These are known as stoichiometric quantities. The stoichiometric quantity can be calculated from the knowledge of the chemical structure and analytical data on the component. Stoichiometry unfortunately is not always calculable. For systems of the present invention, the proper amount of curative is the amount necessary to provide the best desired properties. This amount must be determined experimentally and can be accomplished by routine procedures known in the art. Generally the number of equivalents of reactive curative groups is from about 0.8 to 1.2 times the number of epoxide equivalents present in the curable epoxy resin composition, with from 0.9 to a stoichiometric amount being preferred. The exact amount of constituents in accordance with the above general requirements will depend, as mentioned, primarily on the application for which the cured resin is intended.

These epoxy systems may be cured rapidly with heat to provide a high degree of heat resistance along with a measure of flexibility. The curing temperature range acceptable in this invention is from about 60° C. to about 155° C. for about 1 to 6 hours. Preferably curing is done at about 80° C. to about 125° C. for 2 to 5 hours.

The epoxy compositions herein described are used in applications which require low to moderate viscosity and an extended pot life. In particular, filament windings and pultrusion applications may be quite suitable for use with the formulations described by the invention.

The present invention is also an improved process of forming an article from a continuous filament, the improvement comprising:

(I) coating the filament with an epoxy resin composition comprising:

(A) a liquid diepoxide of molecular weight 350 to 400, and (B) an effective amount of a curing agent, which curing agent is a 1:2 to 1:10, preferably 1:4 to 1:6, mixture of (1) an imidazole compound selected from the group consisting of imidazole and substituted imidazole, and (2) a polyoxyalkylenepolyamine of molecular weight 200 to 2000 selected from the group consisting of the polyoxyalkylenepolyamine of the formula:

$$CH_2[OCH_2CH(CH_3)]_xNH_2$$
$$CH_3CH_2CCH_2[OCH_2CH(CH_3)]_yNH_2$$
$$CH_2[OCH_2CH(CH_3)]_zNH_2$$

wherein x+y+z averages 5.3; and the polyoxyalkylenepolyamine of the formula:

$$H_2NCH(CH_3)CH_2—[OCH_2CH(CH_3)]_xNH_2$$

wherein x averages from 2.6 to 33.1.

(II) shaping the coated filament to the form of the article;

(III) curing the shaped, coated filament at a temperature of 60° C. to 155° C. for 1 to 6 hours, preferably 80° C. to 125° C. for 2 to 5 hours.

The substituted imidazole may be selected from the group consisting of 1-methyl imidazole, 2-methyl imidazole, 2-alkyl imidazole wherein the alkyl group is from 10 to 18 carbon atoms, 2-ethyl-4-methyl imidazole, 2-phenyl imidazole and 1-phenyl-2-methyl imidazole.

Filament winding and pultrusion processes are methods used to fabricate epoxy resin systems into useful products with considerable strength. Certain characteristics of the novel curative are desirable for these processes. Characteristics include a low-to-moderate initial viscosity of the mixed base resin curative system and an extended pot life with relative stable viscosity. This is desirable in order for the resin to be evenly applied to glass or other reinforcing filaments during the winding or pultrusion process.

Many applications also require a high degree of resistance to heat. Therefore, epoxy systems which develop relatively high heat deflection temperatures (HDT) are normally used. Such systems tend to be extensively cross-linked and are, therefore, usually somewhat brittle, an undesirable property. This invention describes curing systems which combine low viscosity with a prolonged pot life. When fully cured at an elevated temperature, the resin systems develop considerable resistance to heat, i.e., high heat deflection temperature values and are less brittle than many epoxy formulations of this type.

Glass fiber and carbon fiber are most common filaments used for this purpose in industrial practice. Boron fiber, silicon carbide fiber, nylon, rayon and polyethylene can also be used. Shaping is most conveniently accomplished by filament winding or pultrusion processes.

In a pultrusion process for shaping, the continuous filament coated with liquid resin is passed through an oven at typically 18 inches/minute at 140° C. Glass reinforced epoxy articles such as rods and electrical insulators are made by this method.

In a filament winding process for shaping, epoxy coated fiber is wound under tension on a shaped core. The article is then cured before removal of the core. Large articles of considerable strength are made by this process.

The present invention is also an article of manufacture comprising a shaped continuous filament coated with a cured epoxy resin composition comprising:
(A) a liquid diepoxide of molecular weight 350 to 400, and
(B) an effective amount of a curing agent, which curing agent is a 1:2 to 1:10, preferably 1:4 to 1:6, mixture of
(1) an imidazole compound selected from the group consisting of imidazole and substituted imidazole, and
(2) a polyoxyalkylenepolyamine of molecular weight 200 to 2000 selected from the group consisting of the polyoxyalkylenepolyamine of the formula:

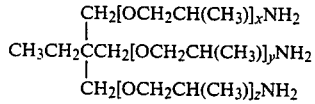

wherein x+y+z averages 5.3; and the polyoxyalkylenepolyamine of the formula:

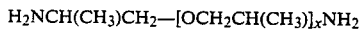

wherein x averages from 2.6 to 33.1.

The substituted imidazole may be selected from the group consisting of 1-methyl imidazole, 2-methyl imidazole, 2-alkyl imidazole wherein the alkyl group is from 10 to 18 carbon atoms, 2-ethyl-4-methyl imidazole, 2-phenyl imidazole and 1-phenyl-2-methyl imidazole.

The following Examples are illustrative of the nature of the instant invention and are not intended to be limitative thereof.

EXAMPLE I

Results of Curing an Epoxy Resin with Blends of Polyoxyalkylenepolyamines and Imidazole The following results were obtained:

| Formulation | 5596- 74B | 37B | 37A | 37C | 37D | 74A |
|---|---|---|---|---|---|---|
| Liquid epoxy resin (WPE~185) | 100 | 100 | 100 | 100 | 100 | 100 |
| Imidazole | 3 | 2 | 1.5 | 1.6 | 0.9 | 1.43 |
| JEFFAMINE ® T403[1] | — | 4 | 4.5 | 6.4 | 9.1 | — |
| JEFFAMINE ® D230[2] | — | — | — | — | — | 8.57 |
| Brookfield viscosity, cps, ~25° C. | >280000 | 10400 | 9250 | 8600 | 9000 | 5000 |
| Properties of Cured ⅛-in Castings:[3] | | | | | | |
| Izod impact strength, ft-lbs/in | 0.19 | 0.12 | 0.12 | 0.13 | 0.12 | 0.14 |
| Tensile strength, psi | 3000 | 8200 | 8200 | 9400 | 8600 | 9100 |
| Tensile modulus, psi | 417000 | 406000 | 390000 | 380000 | 395000 | 395000 |
| Elongation at break, % | 0.7 | 3.6 | 3.7 | 5.0 | 4.3 | 4.6 |
| Flexural strength, psi | 7500[4] | 13200 | 12700 | 13300 | 13800 | 14100 |
| Flexural modulus, psi | 401000 | 389000 | 377000 | 373000 | 374000 | 379000 |
| HDT, °C., 264 psi/66 psi | 122.5/139 | 129/142 | 131/144 | 129/142 | 129/139 | 129/139 |
| Shore D Hardness, 0-10 sec. | 82-80 | 83-82 | 83-81 | 81-79 | 82-80 | 82-80 |

[1]Texaco Chemical Company, Houston, Texas
JEFFAMINE ® T-403 is a polyoxyalkylenetriamine of average molecular weight 400 having the general formula:

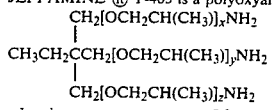

wherein x + y + z averages 5.3.
[2]Texaco Chemical Company, Houston Texas
JEFFAMINE ® D-230 is a polyoxyalkylenediamine of average molecular weight 230 having the general formula:
$H_2NCH(CH_3)CH_2$—$[OCH_2CH(CH_3)]_xNH_2$
wherein x averages 2.6
[3]Cured 2 hours 80°, 3 hours 125° C.
[4]Results erratic A number of properties were improved through use of blends of imidazole and either JEFFAMINE ®D230 or T403. Imidazole, being a high melting solid, is difficult to incorporate into an epoxy resin without partly reacting the resin. This is shown in the high viscosity developed with the resin-imidazole formulation of column 1. Blends of these polyoxyalkylenepolyamines and imidazole, being liquid, are readily solubilized with an epoxy resin yielding the stable, low viscosity system required.

Physical properties improved were tensile and flexural strength while HDT was either increased slightly or remained unchanged. Lower modulus values generally indicate a trend toward less brittleness.

EXAMPLE II

Results of Curing an Epoxy Resin with Blends of Polyoxyalkylenepolyamines and 1-Methyl Imidazole The following results were obtained:

| Formulation | 5596- 62A | 90E | 58D | 83A | 90C | 83B |
|---|---|---|---|---|---|---|
| Liquid epoxy resin (WPE~185) | 100 | 100 | 100 | 100 | 100 | 100 |
| 1-Methyl imidazole | 2.0 | 2.0 | 1.7 | 1.6 | 1.7 | 2.0 |
| JEFFAMINE ® T403 | — | 4.0 | 10.3 | — | — | — |
| JEFFAMINE ® D230 | — | — | — | 6.4 | — | — |
| JEFFAMINE ® D400[1] | — | — | — | — | 10.3 | — |
| JEFFAMINE ® D2000[2] | — | — | — | — | — | 12.0 |

-continued

| Formulation 5596- | 62A | 90E | 58D | 83A | 90C | 83B |
|---|---|---|---|---|---|---|
| Brookfield viscosity, cps, ~25° C. | 9200 | 8800 | 5600 | 4400 | 4200 | 6800 |
| Properties of Cured ⅛-in Castings:[3] | | | | | | |
| Izod impact strength, ft-lbs/in | 0.14 | 0.15 | 0.11 | 0.14 | 0.16 | 0.14 |
| Tensile strength, psi | 7100 | 7400 | 9200 | 7400 | 7500 | 5400 |
| Tensile modulus, psi | 426000 | 404000 | 386000 | 398000 | 389000 | 311000 |
| Elongation at break, % | 2.0 | 2.3 | 4.4 | 2.6 | 3.2 | 2.1 |
| Flexural strength, psi | 13100 | 11900 | 14900 | 12900 | 12200 | 8600 |
| Flexural modulus, psi | 424500 | 414000 | 390000 | 397000 | 378000 | 310000 |
| HDT, °C., 264 psi/66 psi | 134/150 | 129/138 | 123/138 | 119/146 | 117/129 | 114/146.5 |
| Shore D Hardness, 0-10 sec. | 82-80 | 86-85 | 81-79 | 78-76 | 85-84 | 76-74 |

[1]Texaco Chemical Company, Houston, Texas JEFFAMINE ® D-400 is a polyoxyalkylenepolyamine of average molecular weight 400 having the general formula:
$H_2NCH(CH_3)CH_2-[OCH_2CH(CH_3)]_xNH_2$ wherein x averages 5.6
[2]Texaco Chemical Company, Houston, Texas JEFFAMINE ® D-2000 is a polyoxyalkylenepolyamine of average molecular weight 2000 having the general formula:
$H_2NCH(CH_3)CH_2-[OCH_2CH(CH_3)]_xNH_2$ wherein x averages 33.1.
[3]Cured 2 hours 80° C., 3 hours 125° C.

Blends of polyoxyalkylene polyamines with 1-methyl imidazole resulted in cured epoxy resins with properties equal to or exceeding those with 1-methyl imidazole alone. Increased amounts of polyoxyalkylenepolyamine generally resulted in lower modulus values (or decreased brittleness), slightly increased elongation and slightly lowered HDT values. Impact values of resins cured with blends were equivalent to that obtained with 1-methyl imidazole alone.

EXAMPLE III

Results of Curing an Epoxy Resin with Blends of Polyoxyalkylenepolyamines and 2-Ethyl-4-Methyl Imidazole The following results were obtained:

| Formulation 5596- | 58C | 58B | 74C | 62D |
|---|---|---|---|---|
| Liquid epoxy resin (WPE~185) | 100 | 100 | 100 | 100 |
| 2-Ethyl-4-Methyl Imidazole | 4 | 2.3 | 2.0 | 2.8 |
| JEFFAMINE ® T403 | — | 13.7 | — | — |
| JEFFAMINE ® D230 | — | — | 12.0 | — |
| JEFFAMINE ® D2000 | — | — | — | 11.2 |
| Brookfield viscosity, cps, ~25° C. | 18750 | 6400 | 3600 | 9400 |
| Properties of Cured ⅛-in Casting:[1] | | | | |
| Izod impact strength, ft-lbs/in | 0.18 | 0.17 | 0.15 | 0.11 |
| Tensile strength, psi | 7100 | 8400 | 7700 | 6000 |
| Tensile modulus, psi | 402000 | 367000 | 372000 | 328000 |
| Elongation at break, % | 2.1 | 3.8 | 3.2 | 2.6 |
| Flexural strength, psi | 12600 | 13300 | 13500 | 10600 |
| Flexural modulus, psi | 409000 | 384000 | 380000 | 325000 |
| HDT, °C., 264 psi/66 psi | 126/141 | 126/133 | 114/118 | 128/144 |
| Shore D Hardness, 0-10 sec. | 80-79 | 78-76 | 83-80 | 76-75 |

[1]Cured 2 hours 80° C., 3 hours 125° C.

EXAMPLE IV

Viscosity Stability of an Epoxy Resin with Polyoxyalkylenepolyamines + Imidazole or Substituted Imidazole Curing Blend The following results were obtained:

| Formulation 5596- | 73C | 73A | 73B | 79 |
|---|---|---|---|---|
| Liquid epoxy resin (WPE~185) | 100 | 100 | 100 | 100 |
| Imidazole | — | 1.4 | — | — |
| 1-Methyl imidazole | 1.7 | — | — | 2.0 |
| 2-Ethyl-4-Methyl imidazole | — | — | 2.3 | — |
| JEFFAMINE ® T403 | 10.3 | 8.6 | 13.7 | — |
| Brookfield Viscosity, cps, initial (200 g mass @ 50° C.) | — | — | — | 1150 |
| 10 mins. | 500 | 800 | 1000 | — |
| 15 mins. | — | — | — | 750 |
| 30 mins. | — | 800 | 750 | — |
| 40 mins. | 550 | 1150 | 900 | — |
| 45 mins. | — | 1300 | 1250 | — |
| 50 mins. | 800 | — | — | 750 |
| 55 mins. | — | — | 2000 | — |
| 70 mins. | 1300 | 3400 | ~4200 | — |
| 90 mins. | 2000 | — | — | 950 |
| 100 mins. | 2400 | — | — | — |
| 110 mins. | — | — | — | 950 |
| 130 mins. | — | — | — | 1050 |

| Formulation 5596- | 76B | 76A | 79 |
|---|---|---|---|
| Brookfield viscosity, cps, initial (200 g mass @ 40° C.) after: | 1500 | 3600 | 3000 |
| 15 mins. | 950 | 1900 | 2400 |
| 30 mins. | 950 | 1700 | 2500 |
| 40 mins. | 1000 | — | — |
| 45 mins. | — | 1900 | 2500 |
| 55 mins. | 1250 | 2200 | — |
| 60 mins. | — | — | 2500 |
| 75 mins. | 1650 | 3100 | 2800 |
| 85 mins. | 2000 | 4500 | — |
| 90 mins. | — | — | 2800 |
| 100 mins. | 2600 | — | — |
| 105 mins. | — | — | 2800 |

| TABLE OF TEST METHODS | |
|---|---|
| Izod Impact Strength | ASTM D-256 |
| Tensile Strength | ASTM D-638 |
| Tensile Modulus | ASTM D-638 |
| Elongation at Break | ASTM D-638 |
| Flexural Strength | ASTM D-790 |
| Flexural Modulus | ASTM D-790 |
| HDT | ASTM D-648 |
| Shore D Hardness | ASTM D-2240 |

EXAMPLE V

Formulation 5596-83A shown in Example II is to be used in an industrial plant that fabricates automobile parts. The formulation is made up and placed in a heated resin pot which is unattended for many hours. In a pultrusion process a continuous glass filament is passed through the resin pot where the filament is coated with the epoxy resin. The coated filament is passed through an oven at 18 inches/minute at 140° C. and then is formed to the shape of a spring. The shaped filament is cured for 3 hours at 125° C. and then allowed to come to room temperature. A strong, flexible spring is thereby produced which will replace springs which were previously made from steel.

The spring made thereby is shipped to an automobile assembly line and installed in the suspension system of a high performance automobile. The spring function is rated to be a good replacement of the steel spring and its use is continued. A cost savings in parts is thereby achieved.

The principle of the invention and the best mode contemplated for applying the principle have been described. It is to be understood that the foregoing is illustrative only and that after means and techniques can be employed without departing from the true scope of the invention defined in the following claims.

What is claimed is:

1. An epoxy resin composition comprising:
(A) a liquid diepoxide of molecular weight 350 to 400, and
(B) an effective amount of a curing agent which curing agent comprises a 1:2 to 1:10 mixture of
   (1) an imidazole compound selected from the group consisting of imidazole and substituted imidazole, and
   (2) a polyoxyalkylenepolyamine of molecular weight 200 to 2000 selected from the group consisting of the polyoxyalkylenepolyamine of the formula:

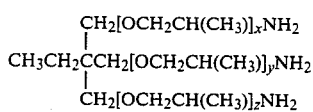

wherein $x+y+z$ averages 5.3; and the polyoxyalkylenepolyamine of the formula:

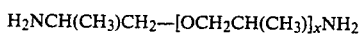

wherein x averages from 2.6 to 33.1.

2. The composition of claim 1 wherein the diepoxide is a diglycidyl ether of bisphenol A.

3. The composition of claim 1 wherein the substituted imidazole is selected from the group consisting of 1-methyl imidazole, 2-methyl imidazole, 2-alkyl imidazole wherein the alkyl group is from 10 to 18 carbon atoms, 2-ethyl-4-methyl imidazole, 2-phenyl imidazole and 1-phenyl-1-methyl imidazole.

4. The composition of claim 1 wherein the imidazole compound is 1-methyl imidazole.

5. The composition of claim 1 wherein the curing agent is a mixture of the imidazole compound 1-methyl imidazole and the polyoxyalkylenepolyamine of the formula:

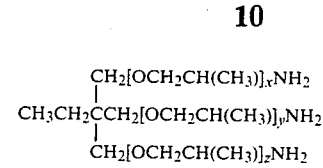

wherein $x+y+z$ averages 5.3.

6. The composition of claim 1 wherein the curing agent comprises a 1:4 to 1:6 mixture.

7. The composition of claim 1 which additionally comprises a filament selected from the group consisting of glass fiber, carbon fiber, boron fiber, silicon carbide fiber, nylon, rayon and polyethylene.

8. The composition of claim 7 wherein the filament is glass fiber.

9. The composition of claim 1 wherein the polyoxyalkylenepolyamine is of the formula

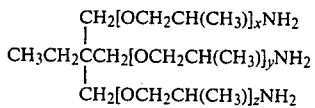

wherein $x+y+z$ averages 5.3.

10. The composition of claim 1 wherein the polyoxyalkylenepolyamine is of the formula

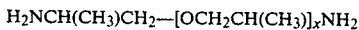

wherein x averages from 2.6 to 33.1.

11. The composition of claim 1 wherein the polyoxyalkylenepolyamine is of the formula

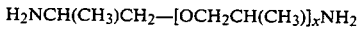

wherein x averages 2.6.

12. The composition of claim 1 wherein the polyoxyalkylenepolyamine is of the formula

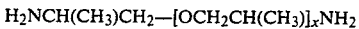

wherein x averages 5.6.

13. The composition of claim 1 wherein the polyoxyalkylenepolyamine is of the formula

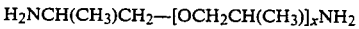

wherein x averages 33.1.

14. The composition of claim 1 wherein the diepoxide is a diglycidyl ether of bisphenol A, the imidazole compound is 1-methyl imidazole and the polyoxyalkylenepolyamine is of the formula:

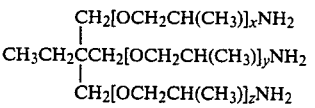

wherein $x+y+z$ averages 5.3.

* * * * *